Aug. 8, 1939.  A. BOND  2,168,435
MACHINE FOR RECONDITIONING BALE BANDS, BOX STRAPPINGS, AND THE LIKE
Filed April 23, 1937    5 Sheets-Sheet 1
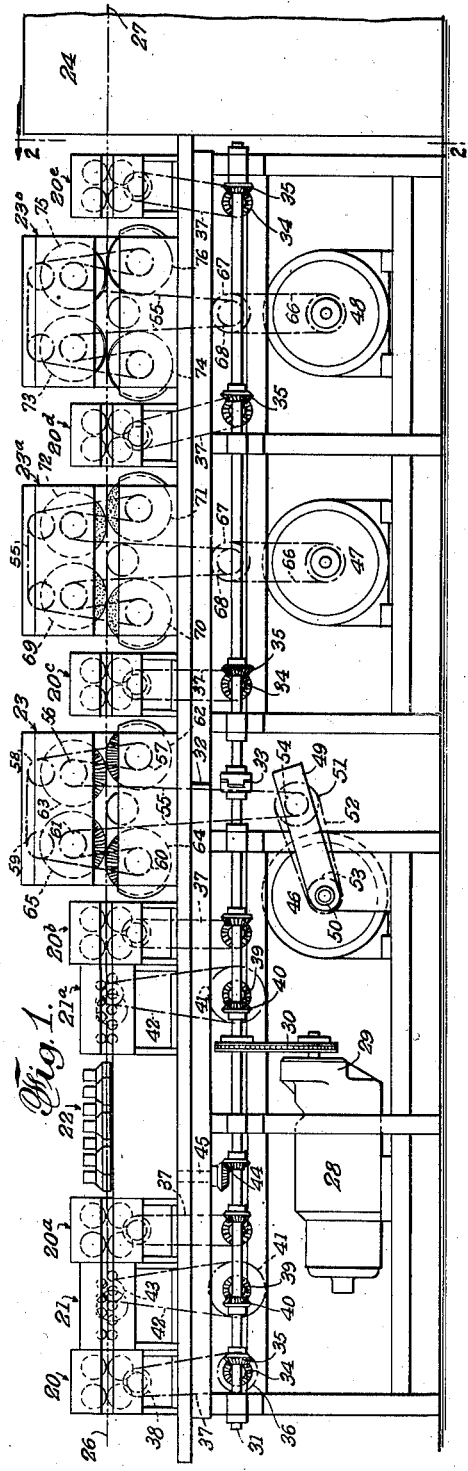
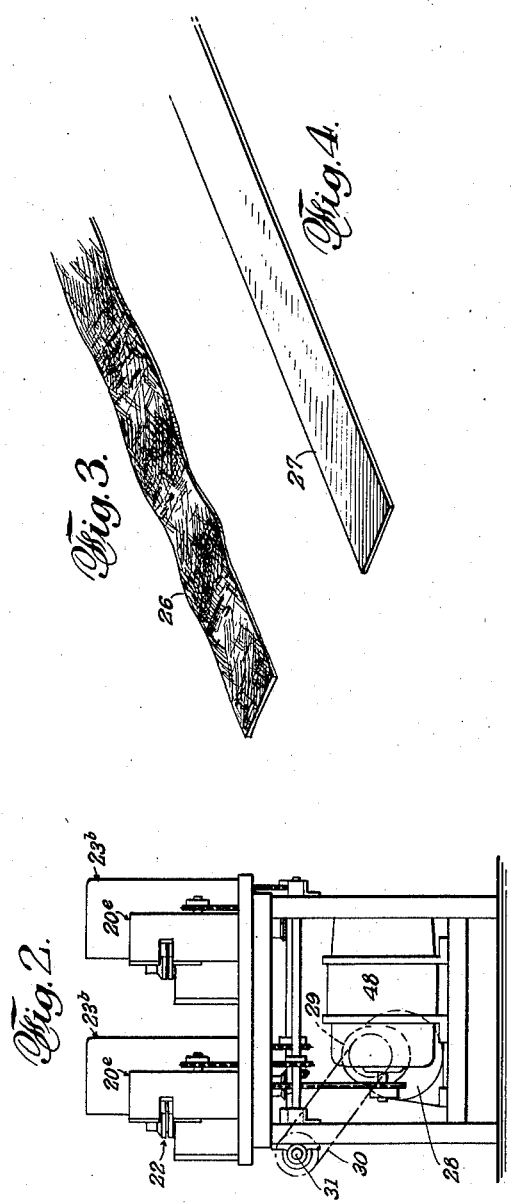
AUSTIN BOND
INVENTOR
BY
ATTORNEY Aug. 8, 1939.  A. BOND  2,168,435
MACHINE FOR RECONDITIONING BALE BANDS, BOX STRAPPINGS, AND THE LIKE
Filed April 23, 1937  5 Sheets-Sheet 2
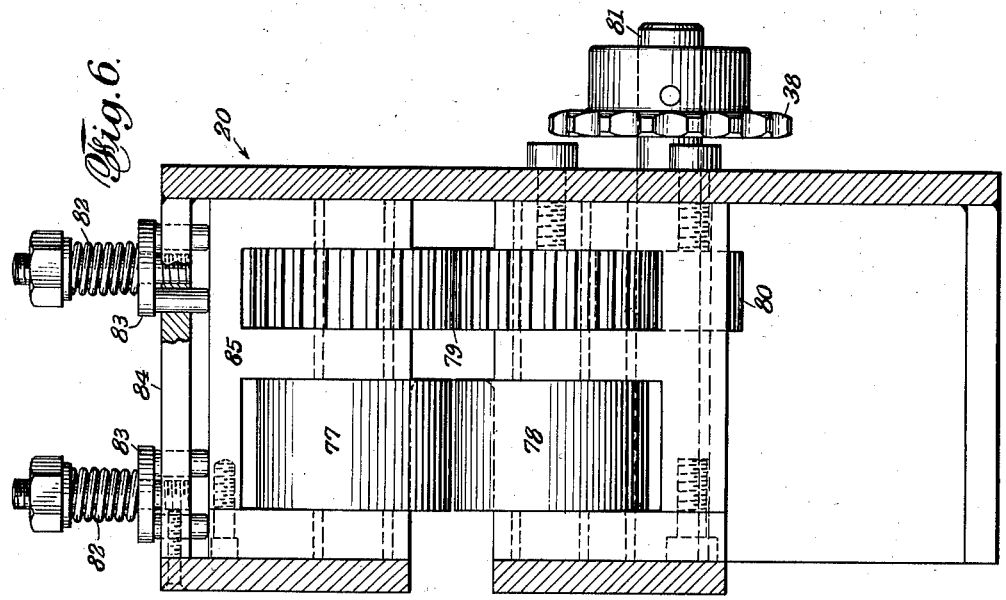
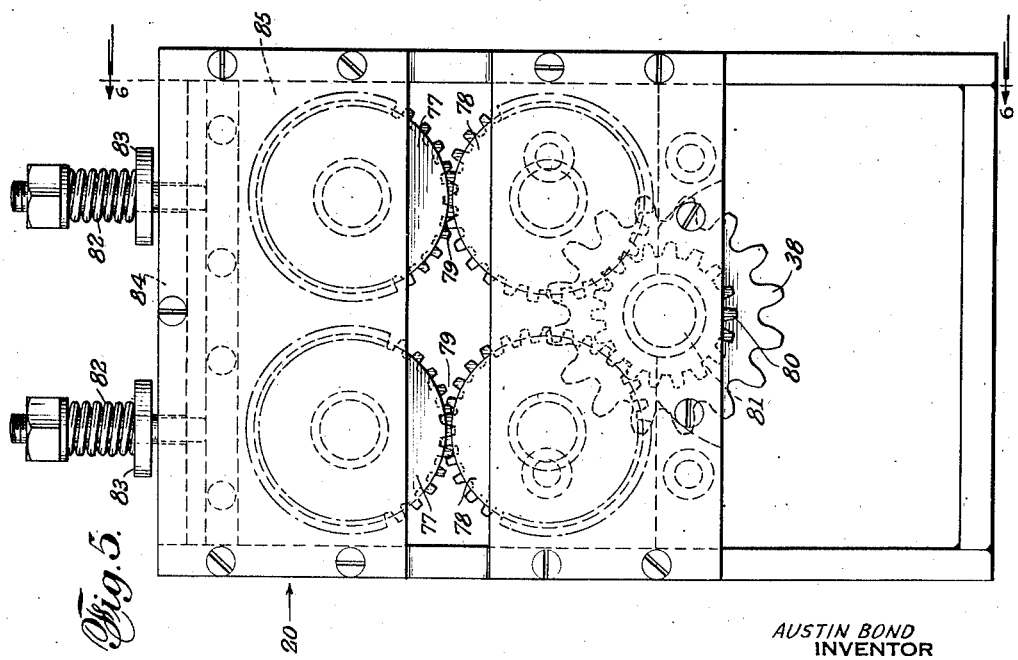
AUSTIN BOND
INVENTOR
BY
ATTORNEY Aug. 8, 1939.  A. BOND  2,168,435
MACHINE FOR RECONDITIONING BALE BANDS, BOX STRAPPINGS, AND THE LIKE
Filed April 23, 1937  5 Sheets-Sheet 3
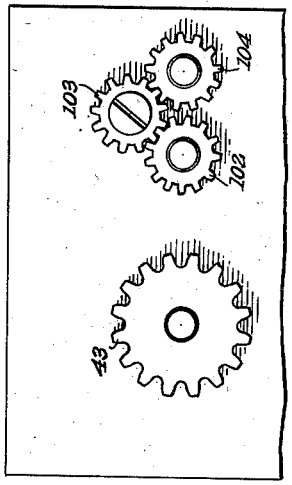
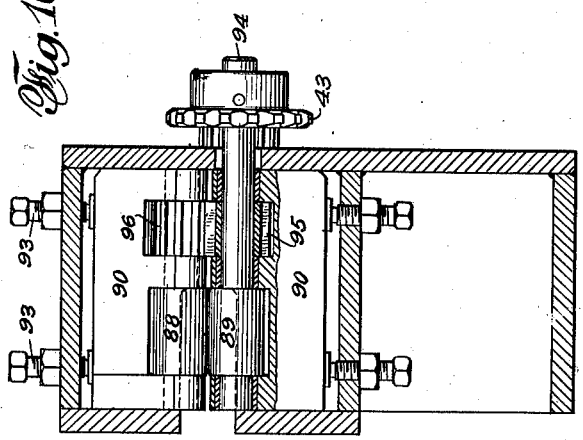
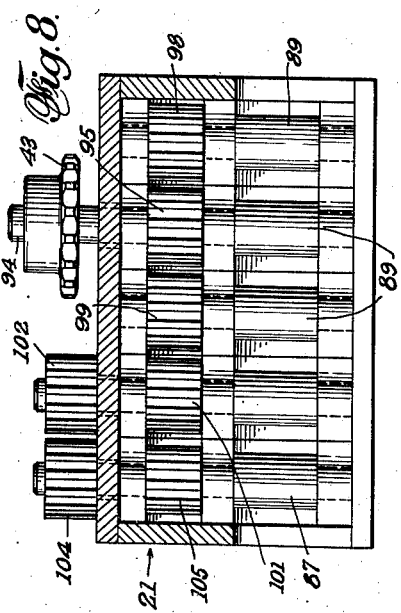
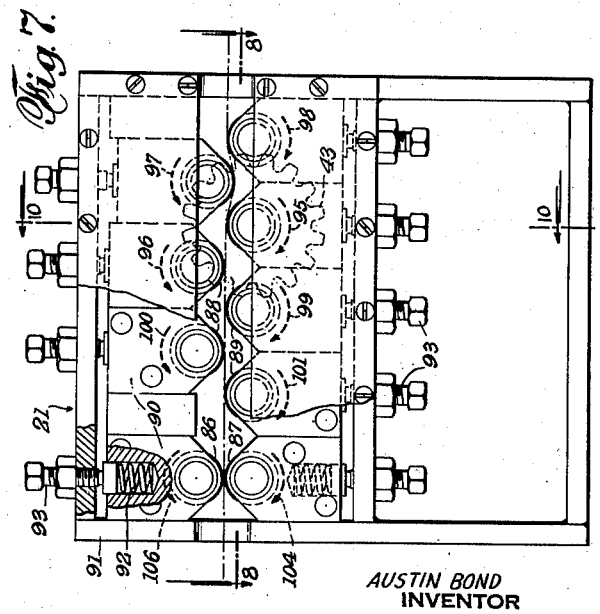
AUSTIN BOND
INVENTOR
BY
ATTORNEY

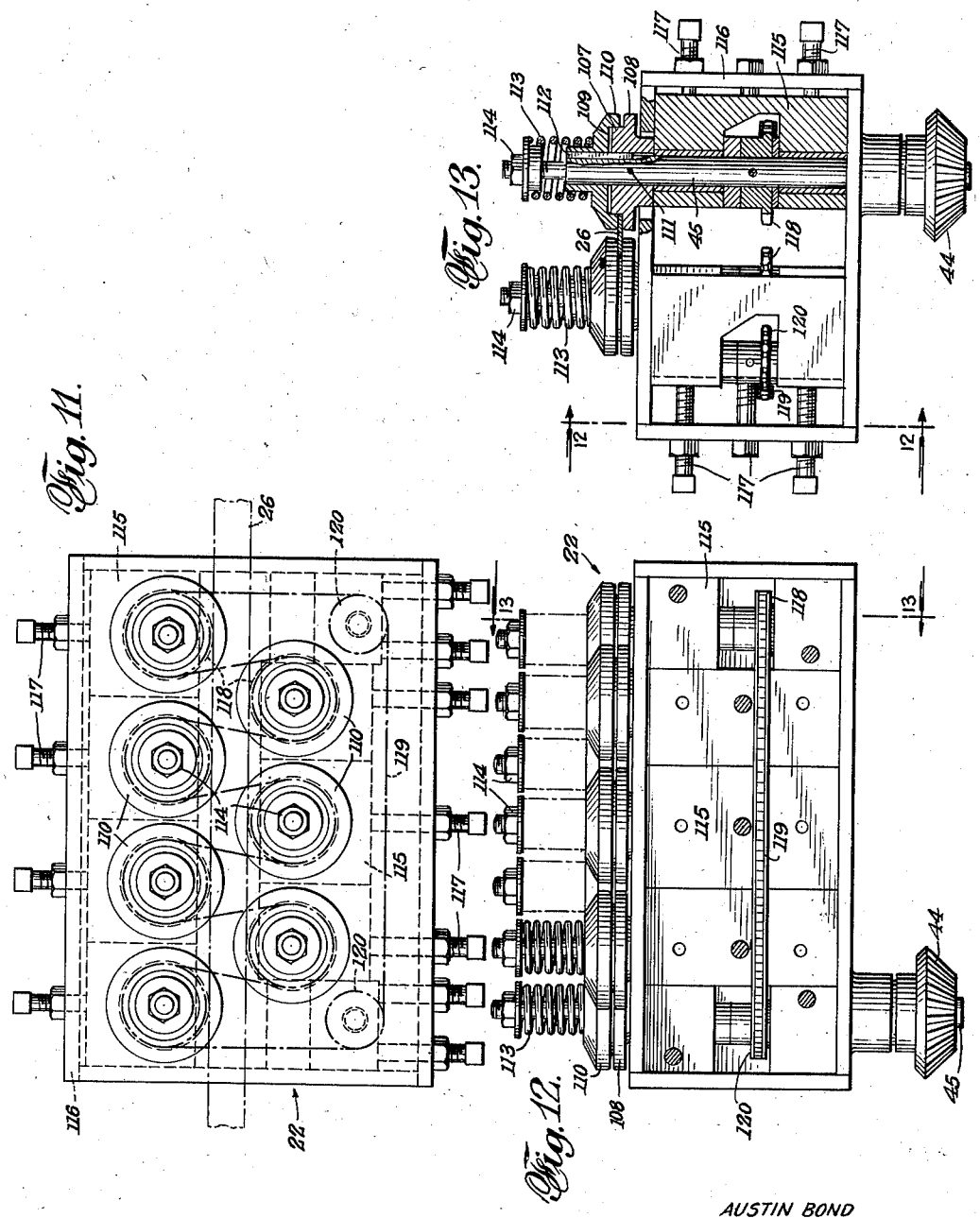

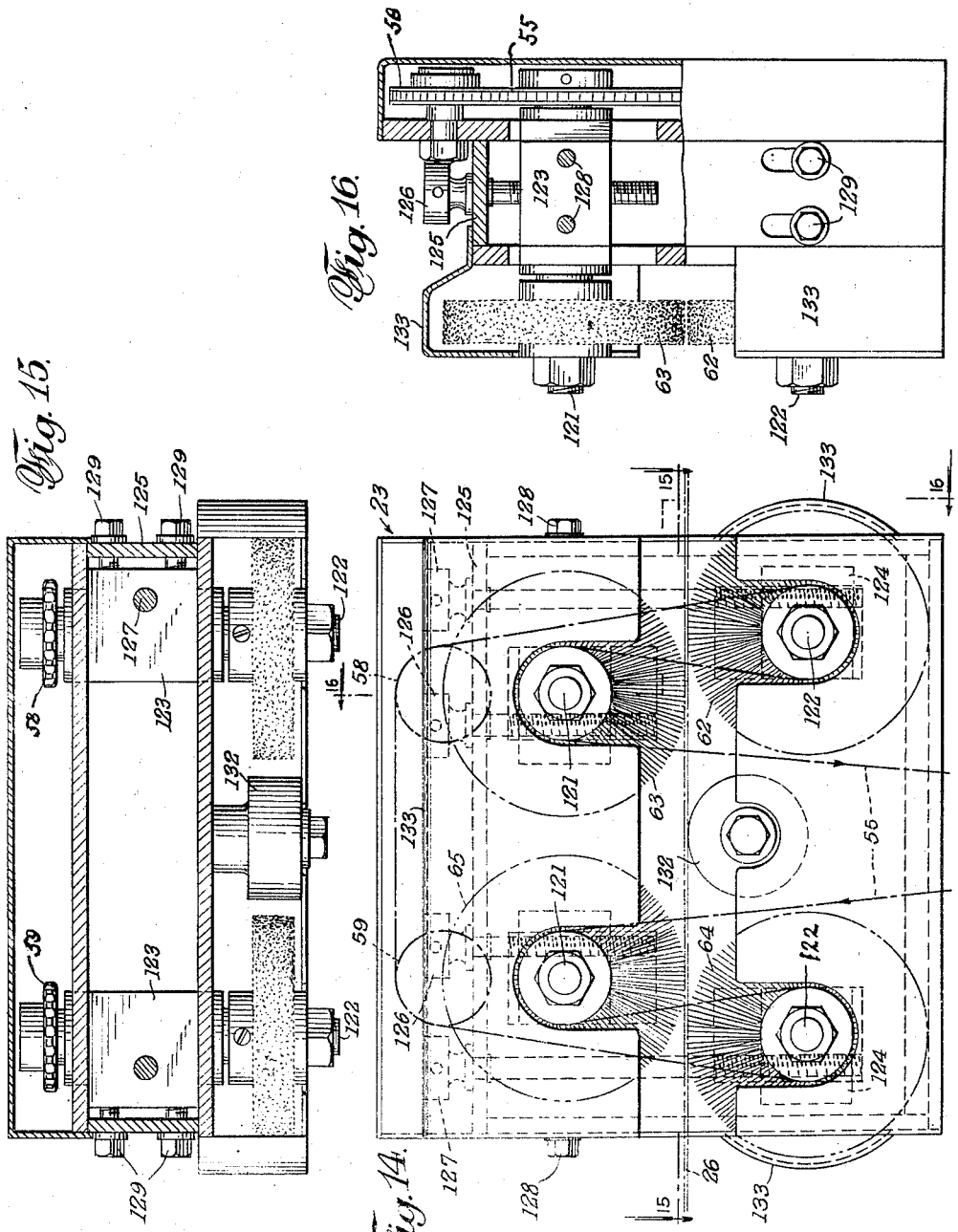

Patented Aug. 8, 1939

2,168,435

UNITED STATES PATENT OFFICE 2,168,435

MACHINE FOR RECONDITIONING BALE BANDS, BOX STRAPPINGS, AND THE LIKE

Austin Bond, New York, N. Y.

Application April 23, 1937, Serial No. 138,519

2 Claims. (Cl. 153—54)

The invention herein disclosed relates to the preparation of strip material, such as used for bale bands, box straps and the like.

Strip material for such purposes usually is a hot rolled mild steel. In service as bale bands and the like, this strip material is subjected to hard usage, being bent, twisted and indented and usually becoming more or less rusted and discolored. Such material, once used, therefore ordinarily is considered as waste and has only a "junk" value.

The present invention in one of its aspects is based on the realization that the steel band or strapping as such, even though it has been roughly handled and apparently "spoiled" for use again, actually in most cases receives no permanent injury from its first use and may by special treatment be restored to condition for use again. In many instances, this reconditioning may actually improve the character of the material for bale banding and like uses.

While possibly the invention primarily is one of reconditioning and reclaiming used bale band and the like, the invention is not so restricted, for as will be appreciated, features of the invention may be employed in the original preparation of bale band, box strapping and the like.

Objects of the invention will be understood from the above to be the preparation of strip material for use as bale bands, box strap and the like, and particularly for restoring and reconditioning used material of this character for use again.

Related objects are to provide necessary equipment for these purposes, which will be entirely efficient and practical.

Further objects and the various novel features of construction, combinations and relations of parts involved in the invention will appear and are set forth in the following specification.

The drawings accompanying and forming part of the specification illustrate a practical commercial embodiment of apparatus for carrying out the invention, but it should be understood that the structure may be modified and changed all within the true intent and scope of the invention as hereinafter defined and broadly claimed.

Fig. 1 is a broken side elevation and somewhat diagrammatic view of a machine for reforming and refinishing used bale band and the like.

Fig. 2 is a view of the right hand end of the machine shown in Fig. 1, as on line 2—2 of that view.

Figs. 3 and 4 are comparative views illustrating in perspective the relative appearance of the rough used band and the refinished stock.

Fig. 5 is a face view of one of the units for feeding the stock.

Fig. 6 is a broken sectional view on substantially the plane of line 6—6, Fig. 5.

Fig. 7 is a broken part sectional view of one of the flattening or horizontal straightening units.

Fig. 8 is a substantially horizontal sectional view of the same as on line 8—8 of Fig. 7.

Fig. 9 is a broken rear face view of the horizontal straightener.

Fig. 10 is a broken vertical sectional view as on substantially the plane of line 10—10 of Fig. 7.

Fig. 11 is a plan view of the vertical straightener or edge truing device.

Fig. 12 is a side view of the same with front cover plate removed, parts appearing in section as on line 12—12 of Fig. 13.

Fig. 13 is a broken cross-sectional view substantially as on line 13—13 of Fig. 12.

Fig. 14 is a side elevation of one of the brushing, cleaning and polishing units.

Fig. 15 is a broken horizontal sectional view as on substantially the plane of line 15—15 of Fig. 14.

Fig. 16 is a broken part vertical sectional view as on line 16—16, Fig. 14.

In the general view Fig. 1, the machine is shown as consisting first of a set of feed rolls 20, for drawing the stock into the left hand end of the machine, a set of straightener rolls 21, for flattening the stock, a second set of feed rolls 20a, a set of edge straightener rolls 22, a second flattening unit 21a, a third set of feed rolls 20b, a brushing unit 23, a fourth set of feed rolls 20c, a second brushing or abrading unit 23a, a fifth feed unit 20d, a third brushing and abrasive unit 23b, a sixth feeder 20e and a coating or finishing unit 24.

Fig. 2 shows how this machine may be built "double" with the successively acting instrumentalities described duplicated in parallel rows along the single table-like base 25.

The used bale band or box strapping which is to be reconditioned may appear somewhat as indicated at 26, in Fig. 3, that is, all more or less wrinkled, bent and indented, encrusted with rust and with the paint, enamel or other surface finish scarred and broken away.

In Fig. 4, there is indicated at 27, the straightened, cleaned, smoothed and finished strip as it issues from the machine.

In Figs. 1 and 2, a single motor is indicated at 28, driving through reduction gearing at 29, and sprocket connection 30, a main shaft 31, extending substantially the full length of the machine. For convenience in manufacture and handling, the machine may be made in two longitudinally separate sections connected as at 32, in Fig. 1, and in such case, the longitudinal shafting 31, may be made in sections connected by suitable coupling as at 33.

The several feed devices are shown operated from the main shaft through the provision of cross shafts 34, driven from the main shaft by bevel gearing 35, and carrying sprockets 36, connected by chains 37, with sprockets 38, at the several units.

Cross shafts 39, driven by bevel gearing 40, from the main shaft carry sprockets 41, connected by chains 42, with the drive sprockets 43, of the flat straighteners 21, 21a.

Bevel gears at 44, provide drive from the main shafting to the vertical drive shafts 45, of the edge straightening units 22.

Individual motor drives are provided in the present disclosure for the three brushing, abrasive and smoothing units 23, 23a and 23b, these motors being designated 46, 47, 48, in Fig. 1. The first of these drives through a belt tightener construction shown as a lever 49, pivoted to swing about the motor center 50, and carrying a sprocket 51, driven by chain 52, from motor sprocket 53, the swinging sprocket 51, carrying a smaller sprocket 54, over which is run a sprocket chain 55, looping in succession over the brush sprockets 56, 57, idler sprockets 58, 59, and brush sprockets 60, 61, to turn the brushes 62, 63, 64, 65, in the direction of strip movement.

The drive from motor 47, is through sprocket chain 66, to sprocket 67, carrying sprocket 68, and from this point on the drive is through a chain 55, and successive sprockets as described in connection with the first unit 23.

The drive for the third unit 23b, from motor 48, is similar to the drive from motor 47, for which reason the same reference characters have been used.

In the present disclosure, while the three units 23, 23a and 23b, are of generally similar construction and for the generally similar purposes of smoothing and surfacing by abrasive action, they may and as illustrated, do differ in their specific functions, the first being shown as having the steel brushes 62, 63, 64, 65, acting on the opposite faces and edges of the strip to remove dirt, scale, rust, paint, enamel, or other surface material, the second shown as having cushioned abrasive wheels 69, 70, 71, 72, for resurfacing opposite faces of the strip and the third unit as having abrasive cloth or similar finishing wheels 73, 74, 75, 76, for smoothing the opposite faces and edges of the strip.

By reference to Figs. 5 and 6, it will be seen that each set of feed rolls consists of two pairs of opposed upper and lower rolls 77, 78, connected by gears 79, the lower gears being meshed by a drive gear 80, on the shaft 81, of the sprocket 38.

The upper rolls are shown as yieldingly forced toward the lower rolls by springs 82, acting against the thrust pins 83, which project through the top of the roll housing or frame 84, into engagement with the bearing block 85, which carries the upper rolls and gears and which is vertically slidable in said housing.

Details of the two flattening straighteners 21, 21a, are shown in Figs. 7, 8, 9, 10.

Each of these units is made up of first a pair of opposed upper and lower rolls 86, 87, and a series of alternate or diagonally related rolls 88, 89, located and arranged to stress the metal in opposite directions. All these rolls are shown as mounted in blocks 90, vertically slidable in the casing or frame 91, and in which are seated springs 92, backed up by adjustment bolts 93.

The drive sprocket 43 is shown as mounted on the shaft 94, of the next to the last lower roll 89, and this shaft carries a pinion 95, meshing with pinions 96, 97, on the shafts of the last two of the upper rolls.

Pinion 97, of the last upper roll meshes with a pinion 98, of the last lower roll. Pinion 96, of the next to the last upper roll meshes with the pinion 99, of the lower roll forward of that and the latter meshes pinion 100, of the next upper forward roll, which pinion in turn meshes pinion 101, of the next forward lower roll. Drive from the latter roll is by pinion 102, at the back, Figs. 8 and 9, through an intermediate pinion 103, to pinion 104, on the first lower roll shaft, which with the inside pinion 105, Fig. 8, drives pinion 106, of the first upper roll. In this manner, the two sets of upper and lower straightening and flattening rollers are all driven in the same, stock advancing direction.

Details of the vertical straightener 22 are shown in Figs. 11, 12 and 13. This straightener is made up of alternately disposed edge engaging and gripping rolls consisting each in the illustration of a lower horizontally disposed roll member having a cylindrical shoulder 107, to abut and an annularly extending flange 108, to support the strip edge, and an upper companion roll element cylindrically recessed at 109, to slidingly fit down over the cylindrical portion of the lower element and having an annular flange 110, opposed to the annular flange 108. The lower roll element is pinned on its supporting shaft 111, and the upper telescopic element is slidingly keyed on the shaft at 112, and thrust toward the lower element by a compression spring 113, backed up by an adjustable abutment 114. With proper adjustment, these rolls can be made to grip opposite edges of the strip and to smooth and iron out irregularities in the immediate edge and adjoining portions of the strip. Adjustment of the opposed sets of rolls is provided for by mounting them in boxes 115, slidable in the frame or casing 116, and adjusted and secured in positions of adjustment by bolts such as indicated at 117.

Drive of the opposed alternately arranged straightening rolls is effected in the illustration by sprockets 118, on the several roll shafts 45, around which is laced a sprocket chain 119, in the zig-zag relation indicated in Fig. 11, it completing its course over idler sprockets 120.

The construction of the three surfacing devices 23, 23a, 23b, is shown in Figs. 14, 15, 16. In each of these units, there are two upper spaced shafts 121, and two lower more widely spaced shafts 122, mounted in sliding boxes 123, 124, vertically adjustable in the frame and housing 125, by bolts 126, 127, and secured in the desired adjusted relations by the lock bolts 128, 129.

Drive of the alternately disposed upper and lower shafts 121, 122, is accomplished in the illustration by running the sprocket chain 55, in the zig-zag relation shown in Fig. 14, over the sprockets 56, 57, 60, 61, on the back ends of the shafts and around the two idler sprockets 58, 59, at the top. The stock is shown supported in the space between the two sets of upper and lower brushes by a guide roll 132.

In the present disclosure, the first abrasive unit is shown as having steel wire brushes 62, 63, 64, 65, acting on the flattened and straightened strip, and the other two units as having cushioned abrasive wheels 69, 70, 71, 72 and 73, 74, 75, 76, for re-surfacing and smoothing the brushed strip, but the type of surfacing elements and the number and relations of such elements may be varied to meet different requirements. Abrasive belts may be used in place of the brush or wheel type of surfacing elements and these elements may be encased, wholly or partly as indicated at 133, and if desired, connected with an exhaust system for carrying off the dust.

The various steps of flattening, edge straightening, brushing and surfacing convert the stock from a rough wrinkled condition, like that shown in Fig. 3, to a smooth flat finish, such as shown in Fig. 4, and in this condition, the bale bond, box strapping or the like, is ready for use. It is desirable however, to put the strap through a rust-proofing operation, such as coating with a paint or enamel. While various kinds of coating devices may be employed, such as dipping, brushing, spraying, it is preferred at present simply to run the strip between yielding rolls, to which the coating material is fed, as by means of suitable fountain rolls. The details of such coating rolls are not illustrated, it being understood that they are suitably mounted in the coating chamber 24. If the coating material contains dangerous solvents or the like, the vapors may be carried away by a suitable exhauster connected with the casing 24. Various heating, cooling, or drying effects may be employed to quickly harden or dry the coating medium, so that the finished stock may be handled immediately as it comes from the machine.

Under present methods, the lengths of finished stock issuing from the machine are taken by a conveyor deposited in a collecting trough or holder and then bundled in straight lengths, but these steps also may be varied.

The flattener rolls at 20 and 21a, by flexing and working the material, have a beneficial effect upon the metal and the longitudinal tensioning accomplished by the feed rolls and abrasive or surfacing devices also is of advantage to the stock. The edge straighteners in truing up the edges may exert a certain transverse cramping action on the stock, which would have a tendency to develop or to accentuate any inherent or incipient irregularities in the strip. Any such faults however, are immediately corrected by the second flattener 21a. The feed rolls also exert a desirable flattening and smoothing effect. These feed devices exert a holding, guiding and advancing effect eliminating the need for special guides between the different instrumentalities. Guides however, may be provided wherever considered desirable and if preferred, a guide channel or passage for the stock may be provided substantially from one end of the machine to the other, interrupted only at the points necessary to leave clearance for the various instrumentalities to operate upon the stock. The rotating abrasive elements have a feeding effect upon the stock, making it possible in some instances, to omit the feed rolls between successive abrasive units. As a rule however, it is considered preferable to provide feed units as indicated between the successive instrumentalities of the machine and while no feed rolls are shown between the edge straightener 22 and the second flattener 21a, it is considered that the same may be employed, if found desirable at this point. One important reason for feed rolls between successive units is to facilitate the handling of short lengths of strip, the same enabling the machine to operate on the shorter as well as long lengths of strip material.

It is contemplated that rough strip stock in course of manufacture, may be put through the machine for finishing purposes. Actually therefore, the one machine may be used either for finishing stock in process of manufacture or for reconditioning or renewing stock which has been used.

While the invention may be considered as primarily directed to the recovery and restoration of used bale band, box strapping and the like, it will be understood from the foregoing that the invention is not confined to such use and is of broad application. The claims and terms employed herein are therefore to be construed in a broad descriptive sense, except possibly as limitations may be implied by state of the prior art.

What is claimed is:

1. In a machine for reconditioning used bale band and the like, edge straightening rolls positioned to operate on opposite edges of the bale band or the like, said rolls consisting each of telescopically related roll elements, one having a cylindrical portion for abutting the extreme edge of the bale band and an annular flange for supporting engagement with one face of the band adjoining said edge, the companion roll element being telescopically engaged over the cylindrical portion of said first roll element and engaging the opposite face of the band adjoining said edge, spring means yieldingly forcing said telescopically related roll elements together to cause them to yieldingly grip the opposite faces of the band along the edge thereof and means for positively rotating said rolls to thereby cause the same to smooth and iron out the opposite edge portions of the strip.

2. In a machine for reconditioning used bale band and the like, edge straightening rolls positioned to operate on opposite edges of the bale band or the like, said rolls consisting each of telescopically related roll elements, one having a cylindrical portion for abutting the extreme edge of the bale band and an annular flange for supporting engagement with one face of the band adjoining said edge, the companion roll element being telescopically engaged over the cylindrical portion of said first roll element and engaging the opposite face of the band adjoining said edge, spring means yieldingly forcing said telescopically related roll elements together to cause them to yieldingly grip the opposite faces of the band along the edge thereof, means for positively rotating said rolls to thereby cause the same to smooth and iron out the opposite edge portions of the strip, said drive means including sprockets connected with said roll elements and a sprocket chain reversely looped about said sprockets to drive the rolls at each side of the band in the same direction.

AUSTIN BOND.